M. L. HAWKS.
VEGETABLE PARER AND CUTTER.
APPLICATION FILED JULY 1, 1908.
APPLICATION FILED APR. 8, 1909.
Reissued June 1, 1909. 12,965.
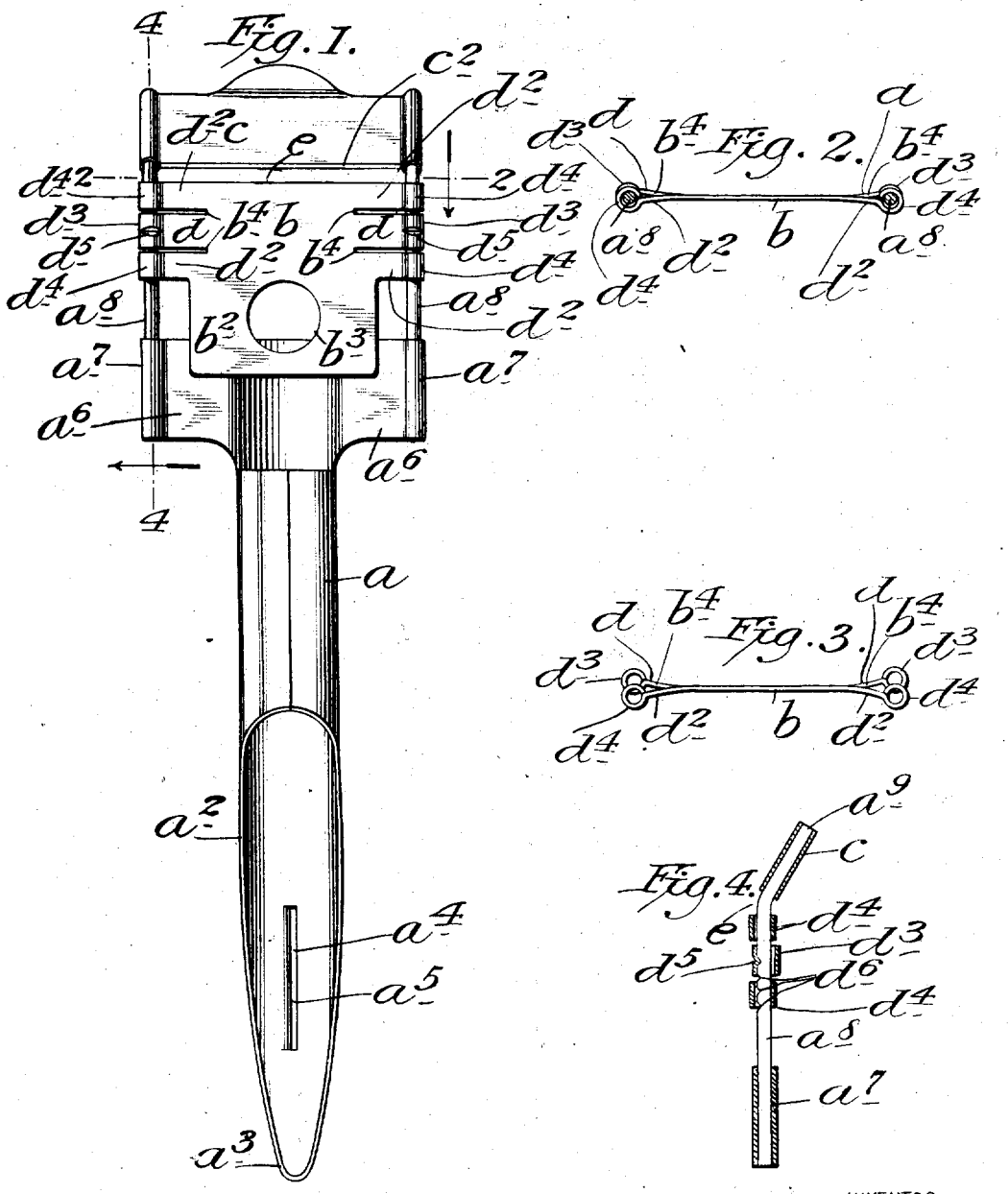
WITNESSES
A. R. Appleman
C. E. Smutzany
INVENTOR
Moses L. Hawks

UNITED STATES PATENT OFFICE.

MOSES L. HAWKS, OF NEW YORK, N. Y.

VEGETABLE PARER AND CUTTER.

No. 12,965. Specification of Reissued Letters Patent. Reissued June 1, 1909.

Original No. 911,239, dated February 2, 1909, Serial No. 441,336. Application for reissue filed April 8, 1909. Serial No. 488,600½.

*To all whom it may concern:*

Be it known that I, MOSES L. HAWKS, a citizen of the United States, and residing at New York, in the county of New York and State of New York, have invented certain new and useful Improvements in Vegetable Parers and Cutters, of which the following is a specification, such as will enable those skilled in the art to which it appertains to make and use the same.

This invention relates to vegetable parers and cutters, and the object thereof is to provide an improved device of this class designed particularly for use in paring and cutting or slicing potatoes, apples and similar vegetables; and with this and other objects in view the invention consists in a device of the class specified constructed as hereinafter described and claimed.

The invention is fully disclosed in the following specification, of which the accompanying drawing forms a part, in which the separate parts of my improvement are designated by suitable reference characters in each of the views, and in which;—

Figure 1 is a plan view of the device involving my invention, Fig. 2 a transverse section on the line 2—2 of Fig. 1, Fig. 3 a view similar to Fig. 2 but showing an adjustable slide forming part of the construction shown in Fig. 2 detached, and;—Fig. 4 a section on the line 4—4 of Fig. 1.

In the drawing forming part of this specification, I have shown a device of the class specified of well known general form in construction, and this device comprises a tubular handle member $a$, one end of which is cut off at a taper as shown at $a^2$ and pointed at $a^3$, and the back part of the tapered portion is provided with a longitudinal slot $a^4$ one side of which is set out to form a cutting blade or edge $a^5$, all of this construction being of the usual form. The tubular handle member $a$ is also provided at the opposite end thereof with side projections $a^6$ having parallel keepers $a^7$ in which are secured parallel rods $a^8$ on which is mounted a slide plate $b$, and the ends $a^9$ of which are bent backwardly at an angle as shown in Fig. 4, and mounted on the end portions $a^9$ of the parallel rods $a^8$ is a transverse plate $c$ having a front cutting edge $c^2$, all these features being also of well known construction, the invention described and claimed herein depending on or being limited to the slide plate $b$, its construction, and connections with the parallel rods $a^8$.

The slide plate $b$ is provided with a backwardly directed extension $b^2$ in which is an aperture $b^3$, said extension and said aperture forming a handle for the manipulation of the said plate; and said slide plate $b$ is also provided at its opposite sides with deep parallel slots $b^4$ forming a central spring tongue $d$ and two side spring tongues $d^2$. The central spring tongues $d$ are provided with keepers $d^3$ and the side spring tongues $d^2$ with keepers $d^4$, and the side rods $a^8$ pass through the keepers $d^3$ and $d^4$ as clearly shown in Figs. 1 and 2. The keepers $d^3$ and tongues $d$ are not in the same plane as the keepers $d^4$ and tongues $d^2$ as clearly shown in Figs. 2 and 3, and the said tongues being of spring material they press on the opposite sides of the rods $a^8$ as clearly indicated in Fig. 4, and the keepers $d^3$ are provided in one side thereof with inwardly directed teeth $d^5$ adapted to engage corresponding recesses $d^6$ in the rods $a^8$, and by means of this construction the slide plate $b$ may be adjusted on the rods $a^8$ as will be readily understood so as to increase or decrease the width of the space $e$ between the plates $c$ and $b$. The keepers $d^3$ and $d^4$ may be easily moved on said rods, the binding action of said keepers on said rods being effected by the spring action of the tongues $d$ and $d^2$, and the fact that said tongues are in different planes.

The use of this device will be the same as others of its class, the point $a^3$ of the handle $a$ being used for coring potatoes and apples and other fruit or vegetables and for taking out specks therein, while the edge $a^5$ is used for paring or peeling such fruit or vegetables, and the cutting edge of the blade or plate $c$ at $c^2$ being used for slicing or dividing such fruit or vegetables, the thickness of the slices or divisions so formed depending on the position of the plate $b$ with reference to the cutting edge $c^2$ of the plate or blade $c$.

Having fully described my invention, what I claim as new and desire to secure by Letters Patent, is;—

1. A device of the class described comprising a handle member provided at one end with parallel rods connected at their ends by a transverse blade having a cutting edge, and a slide plate mounted on said rods and adjustable toward and from the first named plate, said slide plate being provided at its opposite side with projecting spring tongues having keepers through which said rods pass, said keepers being larger than said rods, and the separate keepers at the opposite sides of said slide plate being in different planes when detached from said rods so as to provide a spring pressure of said keepers on said rods.

2. A device of the class described comprising a handle member provided at one end with parallel rods connected at their ends by a transverse blade having a cutting edge, and a slide plate mounted on said rods and adjustable toward and from the first named plate, said slide plate being provided at its opposite side with projecting spring tongues having keepers through which said rods pass, said keepers being larger than said rods, and the separate keepers at the opposite sides of said slide plate being in different planes when detached from said rods, one of said keepers at each side being provided with an inwardly directed tooth, and said rods being provided with notches or recesses in connection with which said teeth operate.

In testimony that I claim the foregoing as my invention I have signed my name in presence of the subscribing witnesses this 30th day of June 1908.

MOSES L. HAWKS.

Witnesses:

A. R. APPLEMAN,

C. E. MULREANY.